United States Patent Office 3,157,522
Patented Nov. 17, 1964

3,157,522
LOW EXPANSION GLASS-CERAMIC AND
METHOD OF MAKING IT
Stanley D. Stookey, Corning, N.Y., assignor to Corning
Glass Works, Corning, N.Y., a corporation of New
York
No Drawing. Filed Mar. 3, 1958, Ser. No. 718,398
5 Claims. (Cl. 106—52)

This invention relates to the production of semicrystalline ceramics by the controlled crystallization of glass and to articles thereof having predetermined size and shape and it relates particularly to the production of semicrystalline ceramic materials and articles essentially comprising $SiO_2$, $TiO_2$, $Li_2O$ and $Al_2O_3$ and having unique and useful properties.

In my copending application Serial No. 588,994, filed June 4, 1956, now Patent No. 2,920,971, it is shown that the addition of 2–20% of $TiO_2$ to glasses containing a major proportion of oxides capable of combining at elevated temperatures to form crystalline compounds renders such glasses controllably crystallizable by heat treatment and, when such glasses are subsequently heat treated, results in their transformation into new and useful semicrystalline ceramics which differ desirably from the original glass in physical, chemical, mechanical and electrical properties. Such ceramics are opaque and generally have positive linear thermal expansion coefficients, hereinafter designated "expansion coefficients," ranging from about $15 \times 10^{-7}$ per ° C. to nearly $200 \times 10^{-7}$ per ° C. between 0° and 300° C.

I have now discovered that glasses essentially comprising $SiO_2$, $TiO_2$, $Li_2O$ and $Al_2O_3$ in amounts totalling at least 95% can be converted by suitable heat treatments, hereinafter described, into semicrystalline ceramics having unique and useful properties such as, expansion coefficients below $15 \times 10^{-7}$ per ° C. and including expansion coefficients so low as to be negative in character, a true porosity of zero, and, in some cases, having the unusual characteristic of being transparent despite a substantial crystal content theoretically exceeding 20% by weight. The invention comprises a glass, a method of treating it and a semicrystalline product resulting from such treatment.

The glass compositions of the invention calculated from their batches to the oxide basis by weight comprise 55–75% $SiO_2$, 3–7% $TiO_2$, 58–82% $SiO_2+TiO_2$, 2–15% $Li_2O$ and 12–36% $Al_2O_3$, the weight ratio $Li_2O/Al_2O_3$ being 0.1 to 0.6, the total $SiO_2$, $TiO_2$, $Li_2O$ and $Al_2O_3$ being at least 95%. Such glasses are entirely vitreous, particularly when allowed to cool rapidly, and they have expansion coefficients exceeding $30 \times 10^{-7}$ per ° C. between 0° C. and 300° C.

The method of converting such glasses to ceramics according to the invention comprises preliminarily heating them between 650° and 800° C. to initiate crystallization thereof and finally heating them between 800° and 1175° C. for 1–4 hours until their expansion coefficients have decreased by more than 75% and are less than $15 \times 10^{-7}$ per ° C., they have infinite viscosity below 1200° C. and they show by X-ray analysis the presence of crystalline beta-eucryptite ($Li_2O \cdot Al_2O_3 \cdot 2SiO_2$) and/or beta-spodumene ($Li_2O \cdot Al_2O_3 \cdot 4SiO_2$).

The heat treatments may comprise either holding the temperature relatively constant in each effective range or gradually increasing the temperature through either or both of the effective ranges. The holding time is longer the lower the selected holding temperature in the effective range. The rate of increase of temperature obviously must not be so high as to cause thermal breakage of the glass and should be slower the thicker the glass. Rates as low as 0.5° C. per minute are suitable for articles several inches thick. Rates as high as 100° C. or more per minute may be used for small articles such as ball bearings ¼ inch or less in diameter. The finished ceramic products, on account of their low expansion coefficients, may be heated or cooled as rapidly as desired below their deformation temperatures. When the ceramic products of compositions 13 and 14, which contain MgO, are cooled slowly, 2° C. or less per minute, their tensile strengths, expansion coefficients and cordierite contents are higher than when they are cooled rapidly in air.

So as to conserve heat, such heat treatments may be carried out following the shaping of the plastic glass and while it is still hot but, if desired, the glass may be cooled to room temperature and subsequently reheated. The shaped glass article preferably is cooled only to 650°–800° C. and is preliminarily heated between these temperatures for a time varying from about 2 hours at the lower temperature to about 10 minutes at the upper temperature. The same result may be obtained by cooling the glass at least to 750° C. and reheating it at about 0.5°–100° C. per minute, depending upon its thickness, to 800° C. The final heat treatment may likewise be accomplished at a specific temperature between 800° and 1175° C. or by increasing the temperature between 800° and 1150° C. at about 0.5°–100° C. per minute. Longer times of heat treatment, although unnecessary, are not detrimental.

The semicrystalline ceramics derived from the glasses of the above recited compositions by such heat treatments have the same chemical compositions on the oxide basis as their respective parent glasses and are opaque when the temperature of the final heat treatment is carried to the upper portion of the recited range above 900° C. and such ceramics are characterized by expansion coefficients less than $15 \times 10^{-7}$ per ° C., flexural strengths greater than those of the corresponding parent glasses, deformation temperatures between 1200° and 1300° C., infinite viscosity at temperatures below 1200° C. and by the presence of crystalline beta-eucryptite and/or beta-spodumene.

I have further found, however, that when the parent glass lies within the above recited range of compositions but within a narrower range comprising 55–75% $SiO_2$, 3–6% $TiO_2$, 58–81% $SiO_2+TiO_2$, 2–6.5% $Li_2O$ and 12–36% $Al_2O_3$, and that when the temperature of the final heat treatment thereof is restricted to the lower portion of the recited final temperature range and not over 900° C., the resulting semicrystalline ceramics are not opaque but are transparent to visible light and can be distinguished from their parent glasses only by the fact that their expansion coefficients are less than $10 \times 10^{-7}$ per ° C., that they contain beta-eucryptite and/or beta-spodumene and that they do not deform at temperatures substantially below 1200° C. Such transparent ceramics become opaque if heated substantially above 900° C., due probably to crystal growth or recrystallization.

By deformation temperature is meant the lowest temperature at which the semicrystalline product of this invention will substantially and permanently deform or the lowest temperature at which the predominant crystalline phase will redissolve.

Infinite viscosity means a viscosity so high that the product exhibits the elastic and mechanical properties attributed to a solid rather than to a liquid.

The annealing point of the glass is the temperature at which its viscosity is $10^{13}$ poises. It may be determined by the method shown in the publication entitled "Re-Evaluation of Glass Viscosities at Annealing and Strain Points," by H. R. Lillie, Jour. Am. Cer. Soc., volume 37, pages 111–117 (1954). An approximation of the annealing point may be determined by the methods described by Tool and Valasek in the Bureau of Standards Scientific paper No. 358 (January 31, 1920).

In the preparation of the compositions of this invention, ordinary batch materials may be used but in lieu of the relatively expensive refined lithium compounds, such as $Li_2CO_3$, it is preferable to utilize petalite or spodumene insofar as is possible since these minerals contain most of the essential components of the glasses with only negligible amounts of impurities. The petalite used in the present batches contains by analysis 77.8% $SiO_2$, 16.8% $Al_2O_3$, 4.5% $Li_2O$ and 0.9% of impurities including ignition loss and negligible amounts of $K_2O$, $Na_2O$ and $Fe_2O_3$.

As examples illustrating the compositions of this invention the following batches in parts by weight are given:

*Table I*

|  | 1 | 2 | 3 | 4 | 5 | 6 | 7 |
|---|---|---|---|---|---|---|---|
| Petalite | 470 | 447 | 421 | 420 | 395 | 341 | 350 |
| $TiO_2$ | 30 | 28 | 23 | 23 | 25 | 35 | 28 |
| $Li_2CO_3$ |  | 43 | 65 | 3 | 50 | 135 | 29 |
| $Al_2O_3$ |  | 13 | 35 | 60 | 64 | 73 | 114 |
| $As_2O_5$ | 3 | 3 | 3 | 3 | 3 | 3 | 3 |

|  | 8 | 9 | 10 | 11 | 12 | 13 | 14 |
|---|---|---|---|---|---|---|---|
| Petalite | 517 | 525 | 517 | 517 | 438 | 668 | 578 |
| Sand |  |  |  |  | 320 |  | 245 |
| $TiO_2$ | 30 | 34 | 33 | 33 | 30 | 58 | 48 |
| $Li_2CO_3$ | 8 |  |  | 4 | 1 |  |  |
| $Al_2O_3$ | 36 | 34 | 37 | 35 | 32 | 104 | 83 |
| $As_2O_5$ |  |  |  | 3 | 3 | 7 | 10 |
| $As_2O_3$ | 3 | 3 | 4 |  |  |  |  |
| $Pb_3O_4$ | 12 |  |  |  |  |  |  |
| $NaNO_3$ |  | 8 |  |  |  |  |  |
| ZnO |  |  | 6 |  |  |  | 10 |
| $Ba(NO_3)_2$ |  |  | 10 |  |  |  |  |
| $CaCO_3$ |  |  |  | 22 |  |  |  |
| $KNO_3$ |  |  |  |  | 12 |  |  |
| MgO |  |  |  |  |  | 47 | 29 |

The above batches were melted for 16 hours at 1550° C., the $As_2O_5$ serving as an oxidizing and fining agent. Other oxidizing agents, such as the nitrates of the alkali metals and of barium or $Pb_3O_4$, may also be used, in which case $As_2O_3$ may be substituted for $As_2O_5$ as the fining agent. A substantial amount of arsenic oxide is volatilized during melting of the glass and the small amount remaining in the glass has no appreciable effect on the properties of the glass and the final crystalline product.

Although the use of a batch containing no oxidizing agent or containing a reducing agent has no substantial effect on the useful properties of the glass and of the ceramic derived therefrom other than its color, the combination of $TiO_2$ and FeO therein causes the development of an objectionable discoloration. The use of materials with particularly low iron contents, however, decreases such discoloration.

When the above batches are melted, the resulting glasses, calculated in weight percent on the oxide basis, are as follows. The arsenic oxide and impurities, being less than 1%, are omitted for convenience:

*Table II*

|  | 1 | 2 | 3 | 4 | 5 | 6 | 7 |
|---|---|---|---|---|---|---|---|
| $SiO_2$ | 73.5 | 69.5 | 65.5 | 65.5 | 61.3 | 53 | 54.5 |
| $TiO_2$ | 6 | 5.5 | 4.5 | 4.5 | 5 | 7 | 5.5 |
| $Li_2O$ | 4.3 | 7.5 | 9 | 4 | 7.7 | 14 | 5.5 |
| $Al_2O_3$ | 16.2 | 17.5 | 21 | 26 | 26 | 26 | 34.5 |

|  | 8 | 9 | 10 | 11 | 12 | 13 | 14 |
|---|---|---|---|---|---|---|---|
| $SiO_2$ | 68 | 68.2 | 67.8 | 66.8 | 68 | 70.7 | 70.7 |
| $TiO_2$ | 5 | 5.7 | 5.5 | 5.5 | 6 | 4.8 | 4.8 |
| $Li_2O$ | 4.5 | 3.8 | 3.9 | 5.5 | 4 | 2.6 | 2.6 |
| $Al_2O_3$ | 20.5 | 21.4 | 20.8 | 20.2 | 21 | 18.1 | 18.1 |
| PbO | 2 |  |  |  |  |  |  |
| BaO |  |  | 1 |  |  |  |  |
| ZnO |  |  | 1 |  |  |  | 1 |
| CaO |  |  |  | 2 |  |  |  |
| $K_2O$ |  |  |  |  | 1 |  |  |
| $Na_2O$ |  | .9 |  |  |  |  |  |
| MgO |  |  |  |  |  | 3.8 | 2.8 |

In Table III are shown the expansion coefficients in whole units (Expn.$\times 10^7$), specific gravities (Sp. Gr.) and annealing points (Ann. Pt.) of the glasses of Table II together with the expansion coefficients, specific gravities, flexural strengths (p.s.i.), the crystal phases of their corresponding ceramic products in the order of their decreasing abundance, and the respective heat treatments used in converting the glasses thereto. For those compositions which can also be converted to a transparent semicrystalline ceramic by suitable variation of their heat treatments, the properties of such transparent ceramics and their respective heat treatments are also shown. The examples showing opaque products are designated by the numbers of the corresponding parent glasses of Table II; and those showing transparent products are likewise designated but are distinguished by the addition of the letter T.

The flexural strengths shown in Table III were measured in the conventional manner by supporting individual cane or rods of the ceramics about ¼ inch in diameter and 4 inches long on 2 knife edges spaced 3½ inches apart and loading them on 2 knife edges about ¾ inch apart centrally spaced from the lower knife edges. To ensure comparable results, the rods were first abraded by being rolled in a ball mill for 15 minutes with 30 grit silicon carbide. Abraded glass rods treated and measured in this manner show flexural strengths ranging from 5000 to 6000 p.s.i.

On account of the tedious and protracted procedures involved in the determination of the physical properties of the foregoing examples, some of their properties were not measured; but where the physical properties of the glasses and their crystalline products have been measured, those properties are given. Even in those cases where the properties are not given, however, the examples represent actual compositions which were compounded, melted to glasses, and treated in accordance with the teachings herein set forth; and the resulting products had the characteristics of the desired ceramics.

Table III

| No. | Glass | | | Heat Treatment | | | | Ceramic | | | |
|---|---|---|---|---|---|---|---|---|---|---|---|
| | Expn. ×10⁷ | Sp. Gr. | Ann. Pt. | Prelim. °C. | Hr. | Final °C. | Hr. | Expn. ×10⁷ | Sp. Gr. | P.s.i. | Crystal Phases |
| 1T | 42.0 | 2.3429 | 678 | 800 | 2 | 880 | 2 | −4.6 | 2.4703 | | b-Spod. |
| 1 | 42.0 | 2.3429 | 678 | 800 | 2 | 1,150 | 4 | −.7 | 2.4591 | | b-Spod., Rutile. |
| 2 | 59.9 | 2.4022 | | 800 | 2 | 880 | 2 | 10.3 | 2.4660 | | b-Spod., Rutile. |
| 2 | 59.9 | 2.4022 | | 740 | 2 | 1,000 | 2 | 12.7 | 2.4514 | | b-Spod., Rutile. |
| 3 | 66.6 | 2.4190 | | 740 | 2 | 1,000 | 2 | 14.5 | 2.4206 | | b-Spod., Rutile. |
| 4 | 38.0 | 2.4078 | 703 | 800 | 2 | 880 | 4 | −5.7 | 2.4752 | | b-Eucryp. |
| 4 | 38.0 | 2.4078 | 703 | 900 | 2 | 1,090 | 2 | 5.3 | 2.5061 | 20,075 | b-Spod., corundum. |
| 5 | 60.9 | 2.4247 | | 700 | 2 | 800 | 2 | 5.2 | 2.4409 | | b-Spod. |
| 5 | 60.9 | 2.4247 | | 700 | 2 | 1,100 | 2 | 8.6 | 2.4322 | 20,276 | b-Spod., Rutile. |
| 6 | 85.6 | 2.4867 | | 570 | 2 | 1,100 | 2 | −7.7 | 2.4438 | | b-Eucryp., Al₂TiO₅. |
| 7T | 46.7 | 2.4500 | 688 | 700 | 2 | 800 | 2 | 1.1 | 2.5350 | | b-Eucryp. |
| 7 | 46.7 | 2.4500 | 688 | 900 | 2 | 1,090 | 2 | 12.8 | 2.5553 | 18,170 | b-Spod., Rutile. |
| 8T | 43.1 | 2.4138 | 676 | 800 | 2 | 880 | 2 | −9.8 | 2.5439 | | b-Eucryp. |
| 8 | 43.1 | 2.4138 | 676 | 800 | 2 | 1,150 | 4 | 2.8 | 2.5021 | | b-Spod., Al₂TiO₅. |
| 9T | 42.3 | 2.3828 | 671 | 800 | 1 | 880 | 4 | −3.5 | 2.5137 | 9,750 | b-Eucryp. |
| 9 | 42.3 | 2.3828 | 671 | 800 | 1 | 1,150 | 4 | 6.9 | 2.4703 | 21,420 | b-Spod., Rutile. |
| 10T | 40.1 | 2.4430 | 672 | 800 | 1 | 880 | 4 | −3.9 | 2.5495 | 10,854 | b-Eucryp. |
| 10 | 40.1 | 2.4430 | 672 | 800 | 1 | 1,150 | 4 | 2.7 | 2.5089 | 17,820 | b-Spod., Rutile. |
| 11T | 44.5 | 2.3964 | 680 | 800 | 1 | 880 | 4 | −5.3 | 2.5054 | 11,748 | b-Eucryp. |
| 11 | 44.5 | 2.3964 | 680 | 800 | 1 | 1,150 | 4 | 7.6 | 2.4795 | 19,858 | b-Spod., Anatase. |
| 12T | 42.5 | 2.3751 | 683 | 800 | 2 | 880 | 2 | −3.8 | 2.4793 | | b-Spod. |
| 12 | 42.5 | 2.3751 | 683 | 800 | 2 | 1,150 | 2 | 8.5 | 2.4609 | | b-Spod., Al₂TiO₅. |
| 13T | 33.9 | 2.3973 | 689 | 815 | 2 | 870 | 6 | 8.7 | 2.5436 | | b-Eucryp. |
| 13 | 33.9 | 2.3973 | 689 | 800 | 1 | 1,200 | 4 | 5.1 | 2.4786 | | b-Spod., cordierite, Rutile. |
| 14 | 33.6 | 2.4035 | 682 | 800 | 1 | 1,100 | 2 | | | | |
| | | | | | | 1,175 | 2 | 6.9 | 2.5073 | 29,440 | |

During the heat treatments of the above examples and in addition to the stated holding times the maximum rate of increase from the stated lower temperature to the stated higher or upper temperatures was 5° C. per minute. Such procedure caused an accompanying increase in the deformation temperature of the product so as to ensure maintenance of its deformation temperature above its static temperature thereby avoiding its distortion during the heat treatment. For a thickness of ¼ inch or less a more rapid temperature increase, up to 10°–100° C. per minute, can also be used.

The above recited ranges of the constituents, $SiO_2$, $TiO_2$, $Li_2O$, and $Al_2O_3$, are critical for the purpose of this invention for the following reasons; difficulty in melting and shaping the glass results from an excess over the stated maximum of $SiO_2$ or of $Al_2O_3$ or a deficiency below the stated minimum of $Li_2O$; a poor chemical stability of the glass and of the final ceramic product is caused by a deficiency of $SiO_2$ or an excess of $Li_2O$; a too high thermal expansion coefficient of the final product also results from an excess of $Li_2O$ as well as from a deficiency of $Al_2O_3$; and an undesirable tendency for the glass to crystallize spontaneously on being cooled is caused by an excess of $TiO_2$ but failure of the glass to crystallize satisfactorily when subsequently heat treated may result from a deficiency of $TiO_2$.

Minor amounts of the other alkali metal oxides, $Na_2O$ and/or $K_2O$, or oxides of the divalent metals of the second periodic group and PbO, particularly MgO, ZnO, BaO and PbO, may optionally be included in the composition to promote meltability of the batch and thermal stability of the glass without materially affecting the basic and novel characteristics of the final product. More specifically, such optional constituents should not exceed a total of 5%, the $Na_2O$ and/or $K_2O$ being not over 3%, MgO and/or ZnO and/or BaO and/or PbO being not over 5%, and CaO being not over 3%.

The crystallization by heat treatment of the glasses of this invention is initiated and controlled by the presence of $TiO_2$ therein, and without $TiO_2$ they cannot be converted to useful crystalline products. The reaction by which their crystallization is initiated and controlled by the presence of $TiO_2$ therein is not clearly understood, since nuclei of $TiO_2$, if formed, are invisible. The initial invisible change in the molecular structure of the glass, which is responsible for its subsequent crystallization, occurs when the glass is heated in a relatively narrow temperature range having a minimum of about 650° C., the latter temperature being in the neighborhood of the annealing points of the present glasses. Below the annealing point such molecular change, if it occurs, is too slow to be practicable.

The maximum effective temperature for the preliminary heat treatment of any specific glass can be determined by means of a conventional microfurnace adapted to melt a droplet of the glass while it is under microscopic observation, the temperature of the droplet being capable of close and rapid control and accurate measurement. For such a determination, the glass droplet, after being completely melted, is cooled to an arbitrarily selected temperature above its annealing point, held for a minute and then reheated to a temperature near enough to the liquidus of the glass to insure that crystallization will occur if the desired molecular change has taken place. If no crystals are to be seen, the droplet is cooled to a somewhat lower temperature than before, held for a minute, and is again reheated to observe crystal formation, if any. Such procedure is continued until the maximum temperature is found, at or below which the glass must be heat treated in order to initiate subsequent crystallization. For the present glasses the maximum effective temperature of the preliminary heat treatment is roughly about 125°–150° C. above the annealing point of the glass.

The liquidus obviously may be determined by cooling and heating the glass droplet until it is crystallized and then further heating it to the temperature at which the crystals are redissolved.

The conversion of the parent glasses to the transparent semicrystalline products of the invention cannot be observed visually but the presence of crystalline material therein, as shown by X-ray analysis thereof, and the accompanying large decrease in the expansion coefficient clearly indicates that such conversion has occurred. The transparency of such semicrystalline products is unusual and is due, it is believed, either to a close similarity between the refractive indices of the crystals and the glass matrix or to the size of the crystals being too small to scatter visible light.

The extremely low or negative expansion coefficients which are attainable in the semicrystalline products of the invention are due to their substantial contents of crystalline eucryptite, which has a negative expansion coefficient, beta-spodumene with an expansion near zero, and perhaps also to solid solutions of these with silica, which also have very low expansion coefficients.

What is claimed is:

1. A transparent glass having an expansion coefficient greater than $30 \times 10^{-7}$ per ° C., which is capable of conversion by heat treatment to a semicrystalline ceramic having a lower expansion coefficient and a higher deformation temperature and containing a crystalline lithium aluminum silicate selected from the class consisting of beta-eucryptite and beta-spodumene, consisting essentially on the oxide basis by weight of 55–75% $SiO_2$, 3–7% $TiO_2$, 2–15% $Li_2O$ and 12–36% $Al_2O_3$, the weight ratio $Li_2O/Al_2O_3$ being 0.1 to 0.6, the total $SiO_2$, $TiO_2$, $Li_2O$ and $Al_2O_3$ being at least 95%.

2. A transparent glass according to claim 1, which is capable of conversion by heat treatment to a semicrystalline transparent ceramic having an expansion coefficient less than $10 \times 10^{-7}$ per ° C. and containing a crystalline lithium aluminum silicate selected from the class consisting of beta-eucryptite and beta-spodumene, consisting essentially on the oxide basis by weight of 55–75% $SiO_2$, 3–6% $TiO_2$, 2–6.5% $Li_2O$ and 12–36% $Al_2O_3$, the weight ratio $Li_2O/Al_2O_3$ being 0.1 to 0.6, the total $SiO_2$, $TiO_2$, $Li_2O$ and $Al_2O_3$ being at least 95%.

3. The method of making a semicrystalline transparent ceramic having an expansion coefficient in the neighborhood of zero which comprises melting a glass consisting essentially on the oxide basis by weight of 55–75% $SiO_2$, 3–6% $TiO_2$, 2–6.5% $Li_2O$ and 12–36% $Al_2O_3$, the weight ratio $Li_2O/Al_2O_3$ being 0.1 to 0.6, the total $SiO_2$, $TiO_2$, $Li_2O$ and $Al_2O_3$ being at least 95%, cooling the glass and preliminarily heating it between 650° C. and 800° C. to initiate crystallization thereof and finally heat treating it between 800° C. and 900° C. for 1–4 hours until its expansion coefficient is less than $10 \times 10^{-7}$ per ° C., and it contains a crystalline lithium aluminum silicate selected from the class consisting of beta-eucryptite and beta-spodumene.

4. The method of claim 3 in which the preliminary heating comprises holding the temperature substantially constant for a time ranging from about 2 hours at 650° C. to about 10 minutes at 800° C.

5. The method of claim 3 in which the preliminary heating comprises increasing the temperature of the glass from about 650° C. to about 800° C. at 0.5°–100° C. per minute.

References Cited in the file of this patent

UNITED STATES PATENTS

| | | |
|---|---|---|
| 1,814,012 | Taft | July 14, 1931 |
| 1,893,382 | Watson | Jan. 3, 1933 |
| 2,113,818 | Sullivan | Apr. 12, 1938 |
| 2,245,137 | Spielholy | June 10, 1941 |
| 2,554,952 | Mockrin et al. | May 29, 1951 |
| 2,876,120 | Machlan | Mar. 3, 1959 |
| 2,920,971 | Stookey | Jan. 12, 1960 |

OTHER REFERENCES

"Phase Diagrams for Ceramists," by Levin, McMurdie and Hall, published by, The Amer. Ceramic Society, Columbus, Ohio, 1956, pages 14 to 25 and 206.